United States Patent
Adugna et al.

(10) Patent No.: US 12,312,556 B2
(45) Date of Patent: May 27, 2025

(54) METHOD OF REDUCING EMULSION BY BROTH WASHING

(71) Applicants: DSM IP Assets B.V., Heerlen (NL); Evonik Operations GmbH, Essen (DE)

(72) Inventors: Negash Adugna, Lexington, KY (US); Martin Heining, Karlstein am Main (DE); Michael Benjamin Johnson, Columbia, MD (US); Neil Francis Leininger, Omaha, NE (US); Kirt Lyvell Matthews, Sr., Fort Mill, SC (US); Ginger Marie Shank, Winchester, KY (US); Nasrin Tabayehnejad, Lexington, KY (US); Vinod Tarwade, Ellicott City, MD (US)

(73) Assignees: DSM IP ASSETS B.V., Heerlen (NL); EVONIK OPERATIONS GMBH, Essen (DE)

( * ) Notice: Subject to any disclaimer, the term of this patent is extended or adjusted under 35 U.S.C. 154(b) by 917 days.

(21) Appl. No.: 17/042,791

(22) PCT Filed: Mar. 29, 2019

(86) PCT No.: PCT/US2019/024764
§ 371 (c)(1),
(2) Date: Sep. 28, 2020

(87) PCT Pub. No.: WO2019/191545
PCT Pub. Date: Oct. 3, 2019

(65) Prior Publication Data
US 2021/0017467 A1    Jan. 21, 2021

Related U.S. Application Data

(60) Provisional application No. 62/652,611, filed on Apr. 4, 2018, provisional application No. 62/650,361, filed on Mar. 30, 2018.

(51) Int. Cl.
*C12M 1/00* (2006.01)
*C11B 1/00* (2006.01)
(Continued)

(52) U.S. Cl.
CPC .............. *C11B 1/025* (2013.01); *C11B 1/108* (2013.01)

(58) Field of Classification Search
CPC ........ C11B 1/108; C11B 1/025; C12M 47/06; C12M 47/02
See application file for complete search history.

(56) References Cited

U.S. PATENT DOCUMENTS 5,399,493 A * 3/1995 Emerson .............. C07K 14/705
435/378
2002/0198177 A1  12/2002 Horrobin
(Continued)

FOREIGN PATENT DOCUMENTS

AU    2017216531 B2   4/2019
CN    1522143         8/2004
(Continued)

OTHER PUBLICATIONS

International Search Report issued in International Application No. PCT/US2019/024764, dated Jun. 26, 2019 (7 pages).
(Continued)

*Primary Examiner* — Nathan A Bowers
(74) *Attorney, Agent, or Firm* — NIXON & VANDERHYE P.C.

(57) ABSTRACT

Disclosed herein are processes for reducing or eliminating emulsion during the process of obtaining a microbial oil comprising one or more polyunsaturated fatty acids (PUFAs) from one or more microbial cells by washing the fermentation broth with at least 1× amount of water. Further disclosed herein is microbial oil comprising one or more
(Continued)

PUFAs that is recovered from microbial cells by at least one process described herein.

11 Claims, 3 Drawing Sheets

(51) Int. Cl.
    *C11B 1/02*     (2006.01)
    *C11B 1/10*     (2006.01)

(56) References Cited

U.S. PATENT DOCUMENTS

| | | |
|---|---|---|
| 2008/0213239 A1 | 9/2008 | Morris |
| 2011/0295028 A1 | 12/2011 | Cherinko et al. |
| 2012/0135479 A1 | 5/2012 | Dillon et al. |
| 2016/0317485 A1 | 11/2016 | Barker et al. |
| 2016/0319218 A1 | 11/2016 | Leininger et al. |
| 2016/0340287 A1 | 11/2016 | McClements et al. |

FOREIGN PATENT DOCUMENTS

| | | |
|---|---|---|
| CN | 103124791 | 5/2013 |
| WO | WO 2011/153246 | 12/2011 |

OTHER PUBLICATIONS

Written Opinion of the International Searching Authority issued in International Application No. PCTUS2019024764, dated Jun. 26, 2019 (6 pages).

\* cited by examiner

METHOD OF REDUCING EMULSION BY BROTH WASHING

CROSS-REFERENCE TO RELATED APPLICATIONS

This application is a National Stage of International Application No. PCT/US2019/024764, filed Mar. 29, 2019, which claims the benefit of the filing date of U.S. Provisional Patent Application No. 62/650,361 filed Mar. 30, 2018, and 62/652,611 filed Apr. 4, 2018, the contents of which are hereby incorporated by reference in their entirety.

FIELD OF INVENTION

The present invention relates to a method of obtaining polyunsaturated fatty acids containing lipids from a lipid-containing biomass.

BACKGROUND OF THE INVENTION

Disclosed herein are processes for obtaining a microbial oil comprising one or more polyunsaturated fatty acids (PUFAs) from one or more microbial cells. Further disclosed herein is a microbial oil comprising one or more PUFAs that is recovered from microbial cells by at least one process described herein.

Microbial oil containing one or more PUFAs is produced by microorganisms, such as, for example, algae and fungi.

A typical process for obtaining PUFA containing oil from microbial cells involves growing microorganisms that are capable of producing the desired oil in a fermenter, pond or bioreactor to produce a microbial cell biomass; separating the biomass from the fermentation medium in which the biomass was grown; drying the microbial cell biomass, using a water-immiscible organic solvent (e.g., hexane) to extract the oil from the dried cells; and removing the organic solvent (e.g., hexane) from the oil.

Another process for obtaining PUFA containing oil from microbial cells involves growing microorganisms that are capable of producing the desired oil in a fermenter, pond or bioreactor to produce a microbial cell biomass; releasing the PUFA containing oil into the fermentation medium in which the cells were grown by using mechanical force (e.g., homogenization), enzymatic treatment, or chemical treatment to disrupt the cell walls; and recovering the oil from the resulting composition comprising PUFA containing oil, cell debris, and liquid using a water miscible organic solvent. The oil can be separated mechanically from the composition and the alcohol must be removed from both the oil and the aqueous biomass waste stream.

More recently, a third, solvent-free method was developed for obtaining PUFA containing oil from microbial cells. The solvent-free process for obtaining PUFA containing oil from microbial cells involves growing microorganisms that are capable of producing the desired oil in a fermenter, pond or bioreactor to produce a microbial cell biomass; releasing the PUFA containing oil into the fermentation medium in which the cells were grown by using mechanical force (e.g., homogenization), enzymatic treatment, or chemical treatment to disrupt the cell walls; and recovering crude oil from the resulting composition comprising PUFA containing oil, cell debris, and liquid by raising the pH, adding a salt, heating, and/or agitating the resulting composition.

The above solvent-free process has the benefit of avoiding the use of a large amount of volatile and flammable organic solvent. This method, however, requires breaking of the thick emulsion that is generated after the cell is lysed and the oil is released and mixed with cell debris and fermentation broth components. This causes long oil recovery times, use of large amounts of chemical reagents (salt, acids, bases etc.) and/or many steps, which can all increase processing costs. In addition, the formation of emulsion during the cell lysing step reduces the efficiency of the oil extraction process and directly affects the extraction yield of such process.

As a result, there is a need for identifying the conditions that are responsible for the formation of emulsion and influencing oil quality, separation, and overall process efficiency. A success in identifying such conditions may lead to the reduction or even elimination of emulsion, thereby minimizing the number of steps in oil extraction, shorten oil recovery times, and help to provide a high yield of top quality PUFA containing oil.

BRIEF SUMMARY OF THE INVENTION

In one embodiment, the present invention is directed to a process for obtaining a microbial oil comprising one or more polyunsaturated acids from one or more microbial cells in a fermentation broth, wherein the process comprises:
 (a) diluting the fermentation broth with at least 1× amount of water;
 (b) separating the cells from the fermentation broth;
 (c) lysing the cells comprising the microbial oil to form a lysed cell composition;
 (d) demulsifying the lysed cell composition to form a demulsified lysed cell composition;
 (e) separating the oil from the demulsified lysed cell composition; and
 (f) recovering the oil.

In one embodiment, in step (a) the fermentation broth is diluted with between 1× and 4× amount of water. In another embodiment, step (b) may be performed by centrifugation.

In one embodiment, the microbial cells are capable of producing at least about 10 wt. %, at least about 20 wt. %, preferably at least about 30 wt. %, more preferably at least about 40 wt. % of their biomass as lipids. In one embodiment, the polyunsaturated lipids comprise one or any combination of DHA, EPA, and ARA.

In one embodiment, the microbial cells are from algae, fungi, protists, bacteria, microalgae, and mixtures thereof. In another embodiment, the microbial cells are from the genus *Mortierella*, genus *Crypthecodinium*, or order Thraustochytriales. In another embodiment, the microbial cells are from the genus *Thraustochytrium, Schizochytrium*, or mixtures thereof. In another embodiment, the microbial cells are from *Mortierella Alpina*.

In one embodiment, the present invention is directed to a process for obtaining a microbial oil comprising one or more polyunsaturated acids from fermentation broth comprising one or more microbial cells, wherein the fermentation broth is diluted with at least 1× amount of water before the cells are separated from the fermentation broth and lysed to release the microbial oil. In a specific embodiment, the fermentation broth is diluted with between 1× and 4> amount of water.

DETAILED DESCRIPTION OF THE INVENTION

Figure 1:
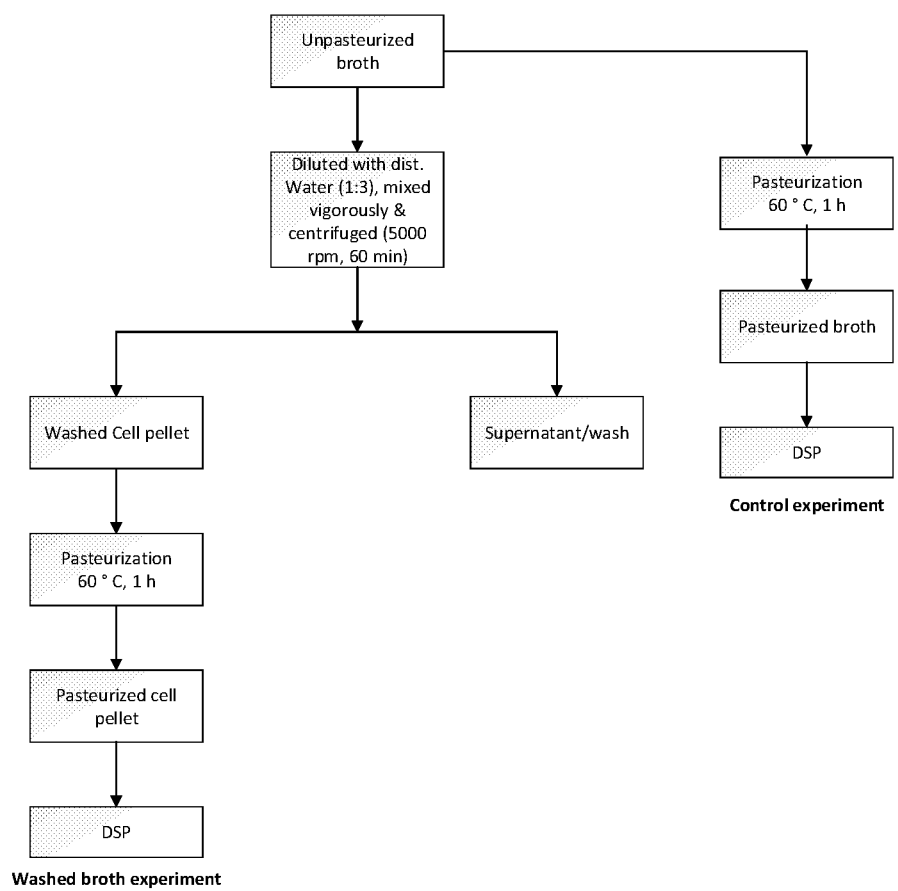
FIG. 1 is a diagram illustrating the experimental design to examine the influence of broth washing on emulsion formation/phase separation during downstream process (DSP).

The features and advantages of the invention may be more readily understood by those of ordinary skill in the art upon reading the following detailed description. It is to be appreciated that certain features of the invention that are, for clarity reasons, described above and below in the context of separate embodiments, may also be combined so as to form sub-combinations thereof.

Embodiments identified herein as exemplary are intended to be illustrative and not limiting.

Disclosed herein is a process for obtaining a microbial oil comprising one or more polyunsaturated acids from one or more microbial cells in a fermentation broth, wherein the process comprises:
  (a) diluting the fermentation broth with at least 1× amount of water;
  (b) separating the cells from the fermentation broth;
  (c) lysing the cells comprising the microbial oil to form a lysed cell composition;
  (d) demulsifying the lysed cell composition to form a demulsified lysed cell composition;
  (e) separating the oil from the demulsified lysed cell composition; and
  (f) recovering the oil.

A particular advantage of the process described in the present invention is that the formation of emulsion is significantly reduced or eliminated by washing the harvested microbial cells with distilled water. While not wishing to be bound by any particular theory, the inventors of the present application believe that washing the harvested microbial cells helps to remove one or more components in the fermentation medium which cause emulsion. Such components include, but are not limited to simple carbohydrates, oligo- and polysaccharides, proteins, and complexes thereof. It was very surprising, according to the present invention to find out that only washing the harvest cells with distilled water significantly reduces the degree of emulsion.

The preferred level of broth washing has been identified in the present invention. In one embodiment, the fermentation broth is diluted with at least 1× amount of water. 1× means the added water is 1 time, or at the same volume, of the fermentation broth that is to be diluted. In another embodiment, the fermentation broth is diluted with more than 1× amount of water, which can be at least 2×, 3×, 4×, 5×, 6×, 7×, 8×, 9×, or 10× amount of water. In another embodiment, the fermentation broth is diluted with between 1× and 4× amount of water. In another embodiment, the fermentation broth is diluted with between 1× and 10× amount of water. The cell is subsequently separated from the diluted fermentation broth and lysed to release the oil.

In another embodiment, the cell is washed more than one time. In one embodiment, the fermentation broth is diluted with at least 1× amount of water, and the cells in the fermentation broth are separated from the liquid portion of the fermentation broth and re-suspended in at least 1× amount of water, and optionally these steps are repeated for more than one time. In another embodiment, the cells in the fermentation broth are separated from the liquid portion of the fermentation broth and re-suspended in at least 1× amount of water, and optionally these steps are repeated for more than one time.

In addition to the above method, any method which is known to reduce the concentration of the various components in the fermentation broth, either by mechanical means, chemical means, physical means, and a combination thereof, may be used by this invention.

Also disclosed herein is a microbial oil obtained by any of the processes described herein.

The microbial oil described herein refers to oil that comprises one or more PUFAs and is obtained from microbial cells.

Polyunsaturated fatty acids (PUFAs) are classified based on the position of the first double bond from the methyl end of the fatty acid; omega-3 (n-3) fatty acids contain a first double bond at the third carbon, while omega-6 (n-6) fatty acids contain a first double bond at the sixth carbon. For example, docosahexaenoic acid (DHA) is an omega-3 long chain polyunsaturated fatty acid (LC-PUFA) with a chain length of 22 carbons and 6 double bonds, often designated as "22:6n-3." In one embodiment, the PUFA is selected from an omega-3 fatty acid, an omega-6 fatty acid, and mixtures thereof. In another embodiment, the PUFA is selected from LC-PUFAs. In a still further embodiment, the PUFA is selected from docosahexaenoic acid (DHA), eicosapentaenoic acid (EPA), docosapentaenoic acid (DPA), arachidonic acid (ARA), gamma-linolenic acid (GLA), dihomo-gamma-linolenic acid (DGLA), stearidonic acid (SDA), and mixtures thereof. In another embodiment, the PUFA is selected from DHA, ARA, and mixtures thereof. In a further embodiment, the PUFA is DHA. In a further embodiment, the PUFA is EPA. In yet a further embodiment, the PUFA is ARA.

LC-PUFAs are fatty acids that contain at least 3 double bonds and have a chain length of 18 or more carbons or 20 or more carbons. LC-PUFAs of the omega-6 series include, but are not limited to, di-homo-gammalinoleic acid (C20:3n-6), arachidonic acid (C20:4n-6), docosatetraenoic acid or adrenic acid (C22:4n-6), and docosapentaenoic acid (C22:5n-6). The LC-PUFAs of the omega-3 series include, but are not limited to, eicosatrienoic acid (C20:3n-3), eicosatetraenoic acid (C20:4n-3), eicosapentaenoic acid (C20:5n-3), docosapentaenoic acid (C22:5n-3), and docosahexaenoic acid (C22:6n-3). The LC-PUFAs also include fatty acids with greater than 22 carbons and 4 or more double bonds including, but not limited to, C24:6(n-3) and C28:8(n-3).

The PUFAs can be in the form of a free fatty acid, salt, fatty acid ester (e.g. methyl or ethyl ester), monoacylglycerol (MAG), diacylglycerol (DAG), triacylglycerol (TAG), and/or phospholipid (PL).

Highly unsaturated fatty acids (HUFAs) are omega-3 and/or omega-6 polyunsaturated fatty acids that contain 4 or more unsaturated carbon-carbon bonds.

As used herein, a "cell" refers to an oil-containing biomaterial, such as biomaterial derived from oleaginous microorganisms. Oil produced by a microorganism or obtained from a microbial cell is referred to as "microbial oil". Oil produced by algae and/or fungi is also referred to as algal and/or fungal oil, respectively.

As used herein, a "microbial cell" or "microorganism" refers to organisms such as algae, bacteria, fungi, yeast, protist, and combinations thereof, e.g., unicellular organisms. In some embodiments, a microbial cell is a eukaryotic cell. A microbial cell includes, but is not limited to, golden algae (e.g., microorganisms of the kingdom Stramenopiles); green algae; diatoms; dinoflagellates (e.g., microorganisms of the order Dinophyceae including members of the genus *Crypthecodinium* such as, for example, *Crypthecodinium cohnii* or *C. cohnii*); microalgae of the order Thraustochytriales; yeast (Ascomycetes or Basidiomycetes); and fungi of the genera *Mucor, Mortierella*, including but not limited to *Mortierella alpina* and *Mortierella* sect. *schmuckeri*, and *Pythium*, including but not limited to *Pythium insidiosum*.

In one embodiment, the microbial cells are from the genus *Mortierella*, genus *Crypthecodinium*, or order Thraustochytriales. In a still further embodiment, the microbial cells are from *Crypthecodinium Cohnii*. In yet an even further embodiment, the microbial cells are selected from *Crypthecodinium Cohnii, Mortierella alpina*, genus *Thraustochytrium*, genus *Schizochytrium*, and mixtures thereof.

In a still further embodiment, the microbial cells include, but are not limited to, microorganisms belonging to the genus *Mortierella*, genus *Conidiobolus*, genus *Pythium*, genus *Phytophthora*, genus *Penicillium*, genus *Cladosporium*, genus *Mucor*, genus *Fusarium*, genus *Aspergillus*, genus *Rhodotorula*, genus *Entomophthora*, genus *Echinosporangium*, and genus *Saprolegnia*. In another embodiment, ARA is obtained from microbial cells from the genus *Mortierella*, which includes, but is not limited to, *Mortierella elongata, Mortierella exigua, Mortierella hygrophila, Mortierella alpina, Mortierella schmuckeri*, and *Mortierella minutissima*.

In an even further embodiment, the microbial cells are from microalgae of the order Thraustochytriales, which includes, but is not limited to, the genera *Thraustochytrium* (species include *arudimentale, aureum, benthicola, globosum, kinnei, motivum, multirudimentale, pachydermum, proliferum, roseum, striatum*); the genera *Schizochytrium* (species include *aggregatum, limnaceum, mangrovei, minutum, octosporum*); the genera *Ulkenia* (species include *amoeboidea, kerguelensis, minuta, profunda, radiate, sailens, sarkariana, schizochytrops, visurgensis, yorkensis*); the genera *Aurantiacochytrium*; the genera *Oblongichytrium*; the genera *Sicyoidochytium*; the genera *Parientichytrium*; the genera *Botryochytrium*; and combinations thereof. Species described within *Ulkenia* will be considered to be members of the genus *Schizochytrium*. In another embodiment, the microbial cells are from the order Thraustochytriales. In yet another embodiment, the microbial cells are from *Thraustochytrium*. In still a further embodiment, the microbial cells are from *Schizochytrium*. In a still further embodiment, the microbial cells are chosen from genus *Thraustochytrium, Schizochytrium*, or mixtures thereof.

In one embodiment, the process comprises lysing microbial cells comprising a microbial oil to form a lysed cell composition. The terms "lyse" and "lysing" refer to a process whereby the wall and/or membrane of the microbial cell is ruptured. In one embodiment, the microbial cell is lysed by being subjected to at least one treatment selected from mechanical, chemical, enzymatic, physical, and combinations thereof. In another embodiment, the process comprises lysing the microbial cells comprising the microbial oil to form a lysed cell composition, wherein the lysing is selected from mechanical, chemical, enzymatic, physical, and combinations thereof.

As used herein, a "lysed cell composition" refers to a composition comprising one or more lysed cells, including cell debris and other contents of the cell, in combination with microbial oil (from the lysed cells), and optionally, a fermentation broth that contains liquid (e.g., water), nutrients, and microbial cells. In some embodiments, a microbial cell is contained in a fermentation broth or media comprising water. In some embodiments, a lysed cell composition refers to a composition comprising one or more lysed cells, cell debris, microbial oil, the natural contents of the cell, and aqueous components from a fermentation broth. In one embodiment, the lysed cell composition comprises liquid, cell debris, and microbial oil. In some embodiments, a lysed cell composition is in the form of an oil-in-water emulsion comprising a mixture of a continuous aqueous phase and a dispersed oil phase.

In general, the processes described herein can be applied to any lipid-containing microbial cells where emulsion may be formed during the process of lipids extraction. In one embodiment, the microbial cells are selected from algae, fungi, protists, bacteria, microalgae, and mixtures thereof. In another embodiment, the microalgae are selected from the phylus Stramenopiles, in particular of the family of *Thraustochytrids*, preferably of the genus *Schizochytrium*. In another one embodiment, the microbial cells described herein are capable of producing at least about 10 wt. %, at least about 20 wt. %, preferably at least about 30 wt. %, more preferably at least about 40 wt. % of their biomass as lipids. In another embodiment, the polyunsaturated lipids comprise one or any combination of DHA, EPA, and ARA.

EXAMPLES

Example 1

In this example, the impact of an additional cell broth washing step on emulsion formation/phase separation was examined.

The experimental design is shown in FIG. 1. In a control experiment, an unpasteurized cell broth containing microbial cells was pasteurized and subject to subsequent downstream process without being subject to any washing step. In a washed broth experiment, the unpasteurized cell broth containing microbial cells was first washed with distilled water, before being pasteurized and subject to subsequent downstream process.

Test 1A—Unwashed Broth Experiment

Figure 2:
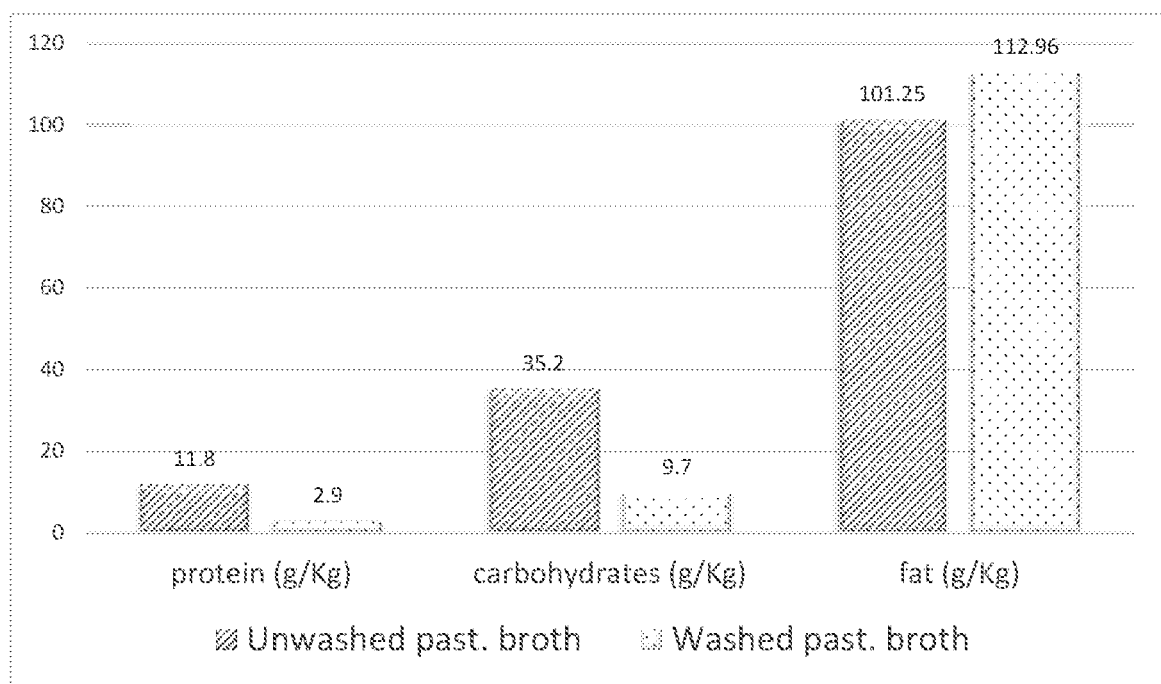
FIG. 2 shows the significant differences in the amount of protein and carbohydrates between an unwashed broth sample and a washed sample.
Figure 3:
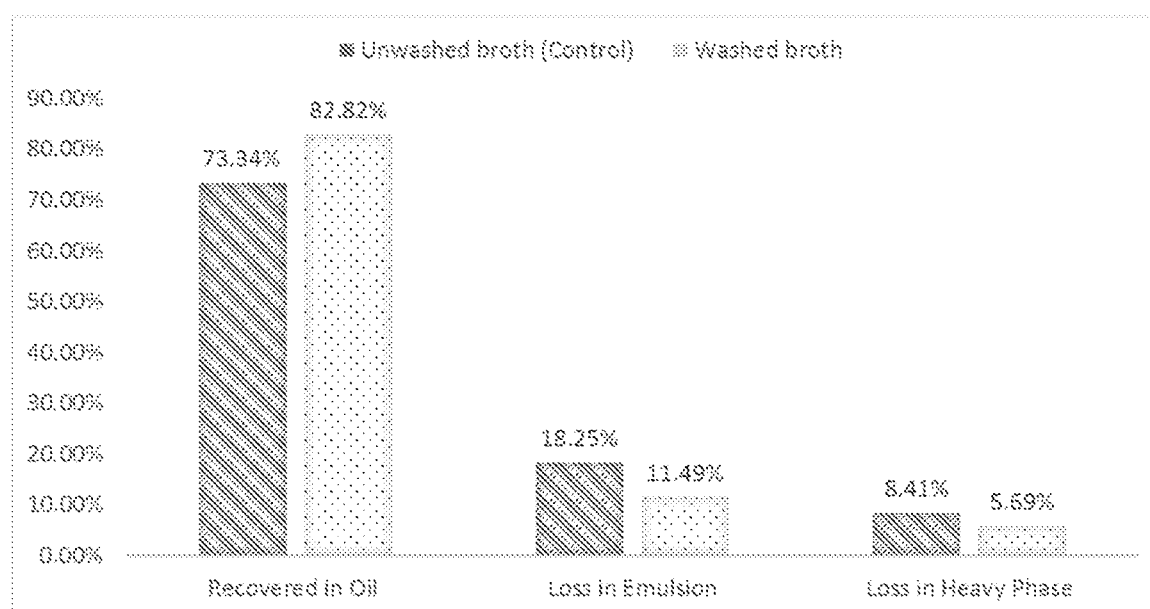
FIG. 3 shows the distribution of fat which were recovered from the oil phase, from the emulsion phase, and lost in the heavy phase in an unwashed broth sample and a washed sample.

In this control experiment, an unwashed cell broth containing microbial cells (*Schizochytrium* sp.) at a biomass density of over 100 g/l was heated to 60° C. for 1 hour in an agitated 3-neck round bottomed flask for pasteurization. After pasteurization, a sample was collected and analyzed for its protein and carbohydrate content. The result is shown in FIG. 2. For the remaining pasteurization broth, the pH was adjusted to 7.5 by using caustic soda (20 wt.-% NaOH solution), before a protease enzyme (Novozymes product 37071) was added in liquid form in an amount of 0.15 wt.-% (by weight broth). Stirring was continued for 2 hours at 60° C. After that, the lysed cell mixture was heated to a temperature of 90° C. The mixture was concentrated by evaporation of water from the lysed broth, until a total dry matter content of about 36.6 wt.-% was reached. The concentrated broth was then demulsified by changing the pH to 10.5 by addition of caustic soda (20 wt.-% NaOH solution). The total amount of caustic soda was about 5.96 wt.-% (based on the amount of initial broth weight) added in the beginning of the demulsification making sure the pH was always below 10.5. After 24 hours, the demulsified broth was neutralized to pH 7.5 by addition of sulfuric acid solution (3N). After neutralization, about 250 g of the homogenized broth sample was taken and separation of the cell debris was carried out by centrifugation at 4500 rpm for 15 min. The percentage fat distributions of the oils which were recovered from the oil phase, recovered from the emulsion phase, and lost in the heavy phase was measured. The result is shown in FIG. 3.

Test 1B—Washed Broth Experiment

In this experiment, an unpasteurized cell broth was diluted with distilled water (broth:distilled water ratio was 1:3). This mixture was shaken vigorously and then centrifuged. The supernatant (water wash) was separated from the cells.

The washed cell broth containing microbial cells (*Schizochytrium* sp.) at a biomass density of over 100 g/l was heated to 60° C. for 1 hour in an agitated 3-neck round bottomed flask for pasteurization. After pasteurization, a sample was collected and analyzed for its protein and carbohydrate content. The result is shown in FIG. 2. For the remaining pasteurization broth, the pH was adjusted to 7.5 by using caustic soda (20 wt.-% NaOH solution), before a protease enzyme (Novozymes product 37071) was added in liquid form in an amount of 0.15 wt.-% (by weight broth). Stirring was continued for 2 hours at 60° C. After that, the lysed cell mixture was heated to a temperature of 90° C. The mixture was concentrated by evaporation of water from the lysed broth, until a total dry matter content of about 35.7 wt.-% was reached. The concentrated broth was then demulsified by changing the pH to 10.5 by addition of caustic soda (20 wt.-% NaOH solution). The total amount of caustic soda was about 3.87 wt.-% (based on the amount of initial broth weight) added in the beginning of the demulsification making sure the pH was always below 10.5. After 24 hours, the demulsified broth was neutralized to pH 7.5 by addition of sulfuric acid solution (3N). After neutralization, about 250 g of the homogenized broth sample was taken and separation of the cell debris was carried out by centrifugation at 4500 rpm for 15 min. The percentage fat distributions of the oils which were recovered from the oil phase, recovered from the emulsion phase, and lost in the heavy phase was measured. The result is shown in FIG. 3.

What is claimed is:

1. A solvent-free process for obtaining a polyunsaturated fatty acid (PUFA) oil from microbial cells in a fermentation broth, wherein the process comprises:
   (a) providing an unpasteurized fermentation broth comprising a biomass of PUFA oil-containing microbial cells;
   (b) washing the biomass by diluting the unpasteurized fermentation broth with at least 2× amount of water sufficient to substantially remove components from the fermentation broth that cause emulsion formation during cell lysing and thereby form a washed fermentation broth comprising PUFA oil-containing microbial cells;
   (c) separating the PUFA oil-containing microbial cells from supernatant liquid in the washed fermentation broth;
   (d) pasteurizing the PUFA oil-containing microbial cells separated from the supernatant liquid of the washed fermentation broth to provide pasteurized PUFA oil-containing microbial cells;
   (e) lysing the pasteurized PUFA oil-containing microbial cells to thereby form a lysed microbial cell composition;
   (f) demulsifying the lysed microbial cell composition to form a demulsified lysed microbial cell composition comprising PUFA oil;
   (g) separating the PUFA oil from the demulsified lysed microbial cell composition; and
   (h) recovering the PUFA oil.

2. The process of claim 1, wherein in step (b) comprises diluting the unpasteurized fermentation broth with between 2× and 4× amount of water.

3. The process of claim 1, wherein step (c) is performed by centrifugation.

4. The process of claim 3, wherein the microbial cells are capable of producing at least about 10 wt. %, at least about 20 wt. %, at least about 30 wt. %, or at least about 40 wt. % of their biomass as lipids.

5. The process of claim 4, wherein said polyunsaturated lipids comprise one or any combination of docosahexaenoic acid (DHA), eicosapentaenoic acid (EPA), and arachidonic acid (ARA).

6. The process of claim 5, wherein the microbial cells are selected from the group consisting of algae, fungi, protists, bacteria, microalgae and mixtures thereof.

7. The process of claim 6, wherein the microbial cells are from the genus *Mortierella*, genus *Crypthecodinium*, or order Thraustochytriales.

8. The process of claim 7, wherein the microbial cells are from the order Thraustochytriales.

9. The process of claim 8, wherein the microbial cells are from the genus *Thraustochytrium, Schizochytrium*, or mixtures thereof.

10. The process of claim 7, wherein the microbial cells are from *Mortierella Alpina*.

11. The process of claim 1, wherein steps (b) and (c) are repeated more than once by resuspending the washed PUFA oil-containing microbial cells in at least 1× distilled water and then separating the resuspended washed PUFA oil containing microbial cells from the supernatant liquid in the washed fermentation broth.

* * * * *